United States Patent [19]
Chen

[11] 3,848,639
[45] Nov. 19, 1974

[54] PIPE RESTRAINING DEVICE
[76] Inventor: Tsuan-Tong Chen, 4001 W. Kirk, Skokie, Ill. 60076
[22] Filed: July 12, 1973
[21] Appl. No.: 378,779

[52] U.S. Cl................ 138/103, 138/106, 248/54 R
[51] Int. Cl............................. F16l 9/18, F16l 3/04
[58] Field of Search .......... 138/103, 106, 110, 111, 138/114; 248/49, 54 R, 74 B, 74 PB, 361 A

[56] References Cited
UNITED STATES PATENTS
| | | | |
|---|---|---|---|
| 3,204,901 | 9/1965 | Dunn | 248/74 |
| 3,326,244 | 6/1967 | Charles et al. | 138/114 |
| 3,771,751 | 11/1973 | Derivaz | 248/74 |

*Primary Examiner*—Herbert Goldstein
*Attorney, Agent, or Firm*—Mann, Brown, McWilliams & Bradway

[57] ABSTRACT

A device for restraining high pressure pipes from whipping, if ruptured, said device comprising a pedestal supporting a sleeve that has an inner diameter that exceeds the outer diameter of the pipe, and is loosely received over the pipe, and that is supported on the pedestal to be spaced from the pipe about its circumference; a pair of tie bands are each looped about the sleeve and tensioned against the sleeve, with the respective tie bands having their ends anchored to the pedestal on either side of the pipe to secure the sleeve against the pedestal in spaced relation about the pipe. The pedestal may be rigidly connected to the building floor, but preferably is resilient in nature in order to act as an energy absorber in resisting pipe whip.

9 Claims, 8 Drawing Figures

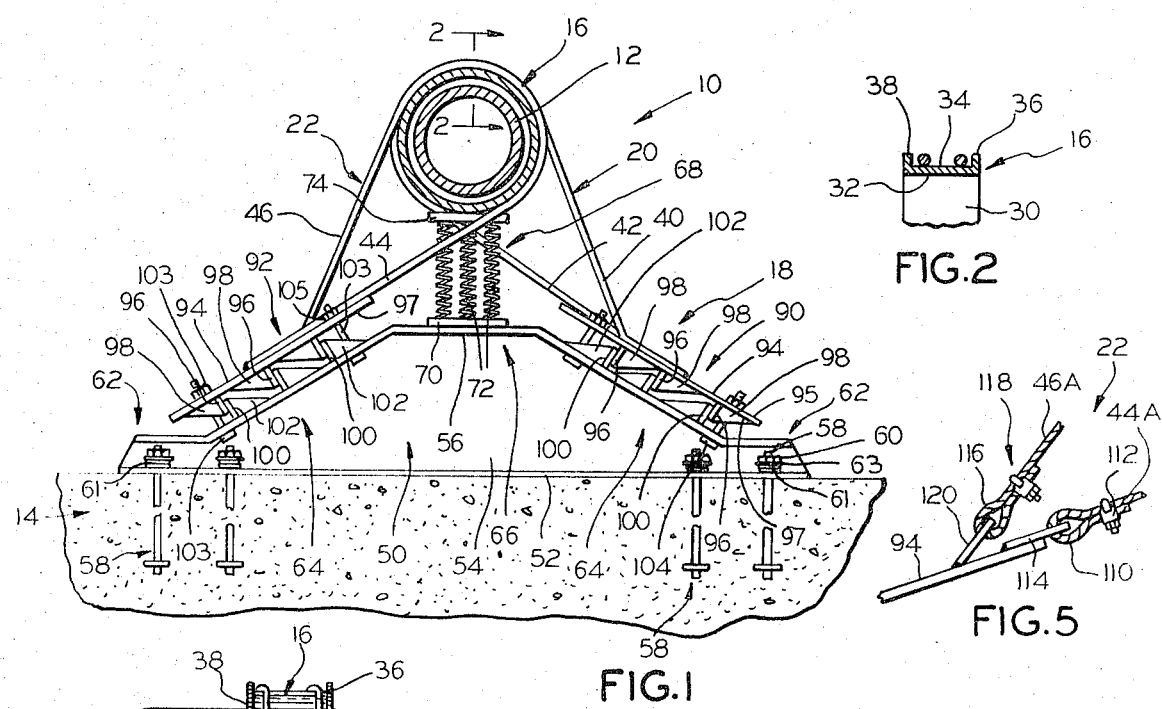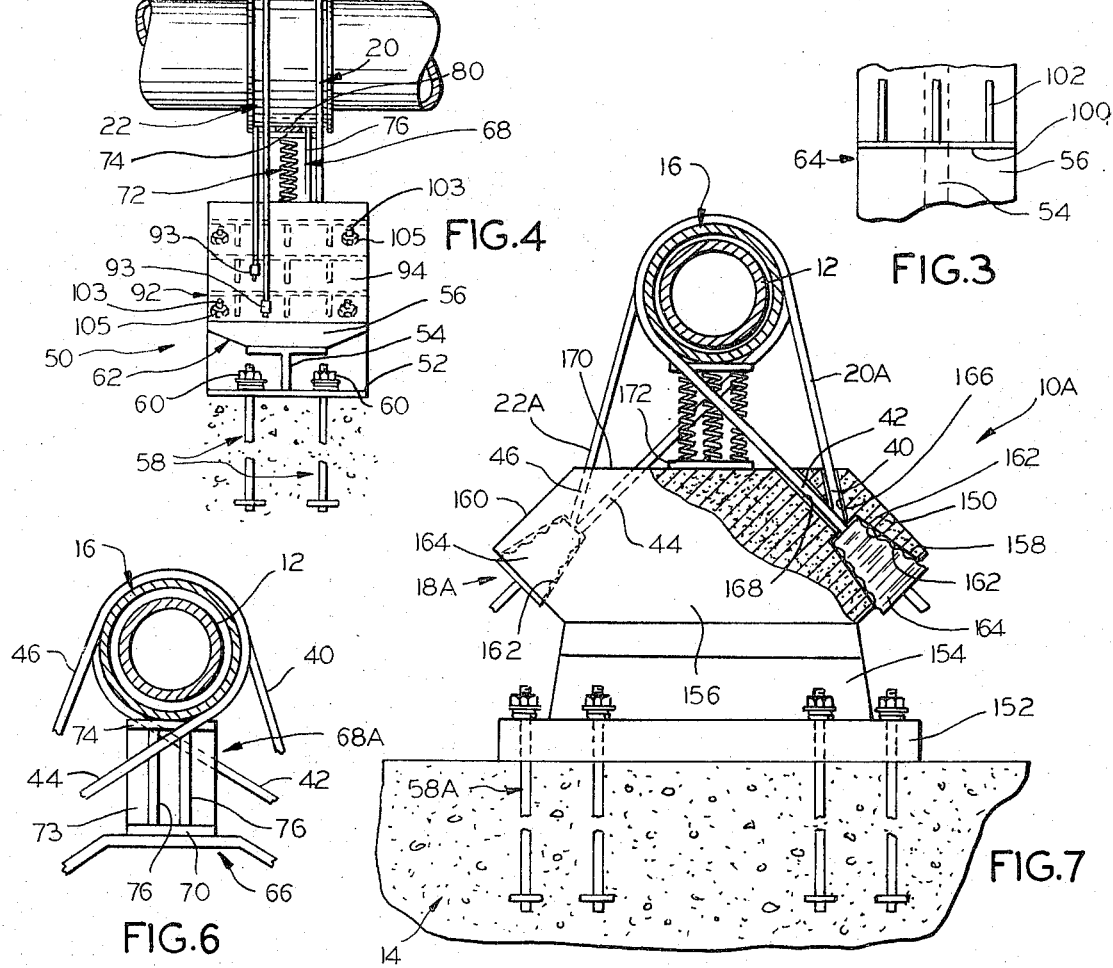

PIPE RESTRAINING DEVICE

This invention is directed to a pipe restraining device, and more particularly, to a device to restrain high pressure pipe from whipping destructively in the event of rupture.

Conventional pipe restraining devices are in the form of a rigid framework erected about the pipe and fixed to the plant floor or the like, depending on the location of the high pressure pipe involved. The frame involved must be designed for the severe impact and bending stress loads and the like, that can be expected in the event that the pipe ruptures and tends to whip under the pressure of fluids escaping therefrom. Each installation must be designed for the specific arrangement it is concerned with, with the result that heretofore little standardization of pipe restraining devices has been possible. Conventional installations are complicated, require excessive structural materials, and occupy too much valuable space, in addition to being difficult of installation.

Furthermore, installation misalignments and thermal movement of the pipe require field adjustment of the restraining device, which heretofore has unduly complicated design of same.

The principal object of the present invention is to provide a pipe restraining device for high pressure lines in which an oversized collar or sleeve is freely received over the pipe, and held in spaced relation thereabout, by tie bands acting in tension, which act in tension to restrain pipe whipping in the event of rupture, and in which the collar or sleeve may be resiliently supported by energy absorbing means that is operative to absorb some of the energy of the pipe when whipping.

Another principal object of the invention is to provide a pipe restraining device that is adapted for standardization of physical arrangement and manufacture for ready satisfying of varient pipe restraining requirements.

Other objects of the invention are to provide a pipe restraining device that has no pipe supporting function as such, under normal use conditions, that is composed of few and simple parts, and that is economical of manufacture, convenient to install, and effective in use.

In accordance with this invention, a pipe restraining device is provided comprising an oversized sleeve or collar that is loosely received over the pipe and supported by a pedestal that may have energy absorbing means incorporated therein to absorb some of the energy of the pipe when whipping. The sleeve or collar has looped about same a pair of tie bands which act in tension to hold the sleeve or collar against the pedestal and space the sleeve or collar from the pipe about the circumference of the sleeve or collar. One of the tie bands has its ends anchored to the pedestal on one side of the pipe, and the other tie band has its ends anchored to the pedestal on the other side of the pipe, whereby the sleeve or collar is biased downwardly against the pedestal by forces acting on same through the tie bands and act in an equal but opposite manner diagonally downwardly in a divergent manner relative to the support for the device pedestal. The pedestal is resiliently flexible and is secured to the building floor by resiliently flexible securing devices that add to the energy absorbing nature of the device.

The device has no pipe supporting function as such, and under normal conditions it is spaced from the pipe, but in the event of pipe rupture the device holds the pipe against whipping under the pressure of the fluids in same and in resiliently yielding in performing this function absorbs some of the excess energy involved in the whipping pipe.

Other objects, uses and advantages will be obvious or become apparent from a consideration of the following detailed description and the application drawings.

In the drawings:

FIG. 1 is a vertical sectional view transversely through the pipe and adjacent floor structure, of the plant or the like in which the pipe is employed, illustrating one embodiment of the invention;

FIG. 2 is a fragmental cross-sectional view of the device sleeve, taken substantially along line 2—2 of FIG. 1;

FIG. 3 is a plan view of a component of a tie band and anchoring device employed in connection with the embodiment of FIG. 1;

FIG. 4 is a side elevational view of the device shown in FIG. 1;

FIG. 5 is a fragmental elevational view illustrating a modification of the embodiment of FIGS. 1 – 4;

FIG. 6 is a view similar to that of FIG. 1, but illustrating the device employing a rigid pedestal;

FIG. 7 is a view similar to that of FIG. 1 but illustrating a modified form of the invention.

Figure 8:
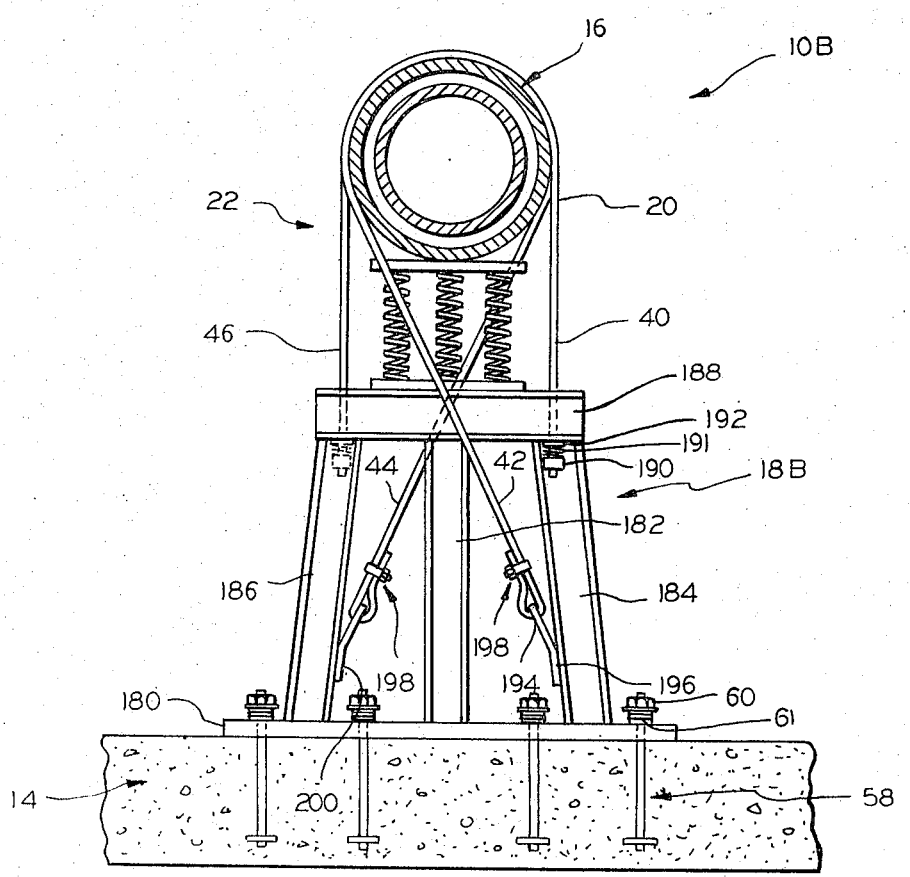
FIG. 8 is a view similar to that of FIG. 1 but illustrating a further modified form of the invention.

However, it is to be distinctly understood that the specific drawing illustrations provided are supplied primarily to comply with the requirements of the Patent Laws, and that the invention is susceptible of modifications and variations by those skilled in the art, which modifications and variations are intended to be covered by the appended claims.

GENERAL DESCRIPTION

Reference numeral 10 of FIGS. 1 – 4 generally illustrates one embodiment of the invention applied to a pipe 12 which is employed to serve as a conduit for fluids under high pressures, such as steam.

The pipe 12 is assumed to be in a power generating plant or the like, having the usual concrete floor 14 (though, of course, the floor can be, and frequently is, made of steel).

The device 10 comprises a sleeve or a collar 16 proportioned to be loosely received over the pipe 12, and supported on pedestal structure 18 so that the sleeve or collar 16 is spaced from the pipe 12 about the circumference thereof.

In accordance with this invention, the sleeve or collar is held in the indicated desired position relative to the pipe 12 (in concentric relation therewith) by a pair of tie bands 20 and 22 that are turnd about the collar or sleeve 16 in open loop manner and have their ends anchored to the pedestal 18, on either side of the pipe 12, in a diagonally divergent manner, to keep the tie bands 20 and 22 tensioned so as to maintain the sleeve or collar 16 in its illustrated position relative to the pipe 12.

The tie bands 20 and 22 are, of course, sufficiently strong and are anchored sufficiently firmly so that in the event of a rupture of the pipe 12, the sleeve or collar 16 will be held firmly against tendencies of the pipe 12 to whip under the action of high pressure fluids escaping therefrom.

In the embodiments of FIGS. 1 – 5, the pedestal structure 18 is of the I beam type, while in the embodiment 10A of FIG. 7 the pedestal structure 18A is of a concrete body type. In the embodiment 10B of FIG. 8, the pedestal structure 18B is of the fabricated tower type. The pedestal structures of the embodiments of FIGS. 1 – 5, 7 and 8 include a resilient support for the pipe encircling collar or sleeve, while in the form of FIG. 6, the collar or sleeve support is rigid.

SPECIFIC DESCRIPTION

The collar or sleeve 16 comprises an annular member 30 formed from steel or the like and shaped to define a sleeve like body portion 32 having a cylindrical bearing surface 34, and defining a pair of spaced apart upstanding radial end flanges 36 and 38. Member 30 may be conveniently formed from a length of steel pipe.

The tie bands 20 and 22 may be in the form of high strength steel wire stranding, steel rodding, or steel banding, or a combination of wire stranding and springs, it being assumed that the bands 20 and 22 illustrated are formed from steel wire strands. The tie band 20 defines end portions 40 and 42 while the tie band 22 defines end portions 44 and 46. As indicated, the tie band end portions 40 and 42 of the tie band 20 are anchored to the pedestal structure 18 at one side of the pipe 12, while the tie band end portions 44 and 46 of the tie band 22 are anchored to the pedestal structure 18 on the other side of the pipe 12. The ends of the bands 20 and 22 extend downwardly of the sleeve 16 in a diagonally diverging manner.

The pedestal structure 18 generally comprises a base beam 50 of I beam transverse cross-sectional configuration defining a base or bottom flange 52, a web 54, and a top flange 56. The base beam 50 is suitably anchored to the floor 14 (which may be in the form of a suitable concrete slab as shown or a suitable steel floor, depending on the specifics of the pipe installation involved). In the form of FIG. 1, suitable anchor bolts 58 are embedded in the concrete 14 and extend through the bottom or base flange 52 for application of suitable nuts 60 thereto with compression springs 61 being interposed between the nut spring seats 63 and the flange 52. A set of the bolts 58 is employed on either side of the web 54 for resiliently anchoring the base beam 50 to the floor 14 through springs 61. Where a steel floor is employed, of course, the base 52 is suitably anchored to the steel floor, as by employing bolts comparable to anchor bolts 58 but more suited for anchoring the base to a steel floor.

The base beam web 54 and top flange 56 are shaped to define in the base beam 50 end portions 62 of limited vertical height, a pair of upwardly inclined shoulder portions 64, and a top or head portion 66 to which is applied a resilient spring post structure 68 against which the sleeve 16 engages under the tension acting in tie bands 20 and 22.

The post structure 68 comprises, in the form shown, a base plate 70, a top plate 74, and a plurality of coil springs 72 interposed between plates 70 and 74, with the springs 72 being applied between suitable spring seats or the like applied to plates 70 and 74 or otherwise suitably secured thereto. Top flange 74 is proportioned to be received between the sleeve or collar end flanges 36 and 38 where the collar 16 is to directly engage the post structure 68, as indicated in FIG. 1. However, it is contemplated that a suitable shim plate, where indicated at 80 in FIG. 4, may be employed between the flange 74 and the sleeve or collar 16 to facilitate adjustment of the height of the installation when this is desired (FIG. 1 shows the collar 16 applied without the shim plate).

Alternately, where no resilient action in the post structure is desired, the plates 70 and 74 are suitably welded together in I beam transverse cross-sectional configuration using a web 73 and stiffener plates 76 on either side of web plate 73, as indicated in FIG. 6, to form rigid post structure 68A. Springs 61 may be omitted from bolts 58 (not shown) in this embodiment.

In the pipe restraining device 10 of FIGS. 1 – 5, the tie bands 20 and 22 are tensioned by having their ends operably associated with a pair of clamp devices 90 and 92 that are of identical construction, as indicated by corresponding reference numerals. The clamp device 90 comprises an anchor plate 94 which has the ends 40 and 42 of tie band 20 suitably affixed thereto, as by welding at 93, on the upper side 95 of same, with the anchor plate 94 having applied to its lower side 97 a plurality of key plates 96 (suitably reinforced by stiffener plates 98) that cooperate with similarly spaced key plates 100 that are affixed to the respective base beam shoulders 64, and specifically the portions of the base beam top plate 56 that define same. Key plates 100 are suitably reinforced by stiffener plates 102. The arrangement of the key plates 100 and their stiffeners 102 is indicated in FIG. 3; the key plates 96 and their stiffeners are arranged in a similar manner. Between key plates 96 and 100, shims may be inserted for adjustment of sleeve position or tightening the tie bands.

With the anchor plates 94 of the respective clamp devices 90 and 92 disposed as indicated in FIG. 1 relative to the respective sets of key plates 100, clamp bolts 103 applied between the respective plates 56 and 94, with plates 94 being tightened down by threading the respective nuts 105 on the respective bolts 103, effects tensioning of the tie bands 20 and 22 as desired to hold sleeve 16 in place and condition the tie bands for resisting pipe whip tendencies in the event of rupture.

In the embodiment of FIG. 1, instead of having the tie band ends welded to the anchor plates 94, the arrangement of FIG. 5 may be employed, which is illustrated in connection with the tie band 22. In the showing of FIG. 5, the tie band 22 has its end portion 44A turned about suitable cable thimble 110 and held in place by employing one or more suitable clamp or clip devices 112. Thimble 110 receives ring element 114 that is suitably affixed to anchor plate 94, as by welding.

Similarly, the tie band end 46A is turned about cable thimble 116 that is secured in place by employing one or more suitable clamp or clip devices 118. Thimble 116 receives ring 120 which is suitably affixed to anchor plate 94, as by welding.

It is contemplated, of course, that the end portions 40 and 42 of tie band 20 may be anchored to anchor plate 94 in the same manner as described in connection with FIG. 5.

In the embodiment of FIG. 7, the pedestal structure 10A generally comprises a body 150 formed from high strength reinforced concrete shaped to define a base flange 152 that is affixed to the floor 14 by employing suitable anchor bolts 58A on either side of the body 150, a shank portion 154, and a head portion 156 defining opposite shoulder portions 158 and 160.

The shoulder portions 158 and 160 are each formed with a conical recess 162 to receive a conventional type of conical body anchoring device 164 to which the respective end portions 40 and 42 of the tie band 20 are applied. The respective tie band end portions pass through the respective openings 166 and 168 that are formed in the body 150 for application to the respective anchoring devices 164.

The body 150 defines upwardly facing load support surface 170 against which the spring post 68 of FIG. 1 bears, with the sleeve or collar 16 bearing against post 68; a suitable shim plate (not shown) may be interposed between the sleeve or collar 16 and the post plate 74 for adjustment purposes, if desired.

In the device 10B (see FIG. 8), the pedestal structure 18B generally comprises a base plate 180 which is suitably anchored to the floor 14 by employing suitable anchor bolts 58 and their associated springs 61 (of FIG. 1) in association with base plate 180; in upstanding relation to base plate 180 is a center leg 182 and legs 184 and 186 on either side of same which have affixed thereto at their upper ends a top beam 188. As indicated in FIG. 7, the legs 182, 184 and 186 as well as the top beam 88 are all of I beam shape transverse cross-sectional configuration. A resilient post 68 is applied to top beam 188 against which the sleeve 16 is applied.

In this embodiment of the invention, the end portion 40 of tie band 20 is suitably anchored to the top beam 188, as by having abutment member 190 affixed thereto which bears against compression spring 191 seated against abutment plate 192 affixed to the top beam 188 on one side thereof, with the tie band 20 having its other end portion 42 brought around the collar or sleeve 16 and looped through the opening 194 of anchor plate 196 that is affixed to the leg 184. In the form shown, a suitable loop clamp device 198 is employed to define the band loop turned about a suitable cable thimble (not shown) which operably engages the anchor plate 196.

The tie band 22 is arranged in a similar manner, its end portion 46 being anchored to the top beam 188 in the same manner as shown in connection with the tie band end portion 40 (but not shown in FIG. 8 as it is on the far side of I beam 188), while its end portion 44 is looped through anchor plate 200 that is affixed to the leg 186. The loop of tie band end portion 44 is defined by employing the suitable loop clamp device 198 and associated cable thimble (not shown).

In the form shown in FIG. 8, the tie band 20 is disposed on one side of the top beam 188 while the tie band 22 is disposed on the other side of the top beam 188.

It will thus be seen that the invention provides a simplified and compact, dual purpose pipe restraining device that is readily adapted to a wide variety of installation situations for the purpose of serving to restrain a high pressure pipe from destructive shipping in the event of rupture. Pipe restraining devices such as those shown in the drawings are installed at strategic points along the length of the high pressure pipe involved where pipe whipping would be a problem in the event of rupture at or near the location involved. The device of this invention is intended to serve no pipe load supporting function, and as a matter of fact, the retaining collar or sleeve is intended to be spaced from the pipe about its circumference during normal use of same. The compactness of this device will provide more room and space in a power plant or the like for other equipment and machinery and therefore save the total cost of a plant.

The restraining collar or sleeve is held in its operative position, in spaced relation with the pipe, by a pair of tie bands turned about the sleeve or collar and having their ends respectively anchored on either side of the pipe to the pedestal device against which the whip restraining collar is biased by the action of the tie bands. The divergent anchoring angles that the tie bands have with respect to the device pedestal effect a centering action on the pipe restraining sleeve or collar that keeps the sleeve in its desired spaced relation relative to the pipe. In the event of rupture, the pedestal structures involved preclude downward whipping of the pipe, and the tie bands preclude whipping in other possible directions about the axis of the pipe.

The resilient post 68, where employed, deflects under any pipe whipping action involved to effect absorption of some of the energy involved in the whipping pipe. The resilient anchoring of the tie bands, and pedestal structures, where employed, also provide energy absorption that is helpful.

Field adjustments for installation tolerance variations and the effects of high temperatures on the high pressure pipe involved are readily effected by employing shim plates as necessary between the whip preventing collar and its supporting pedestal.

While the tie bands 20 and 22 may be turned around the sleeve 16 one or more times (as permitted by the axial length of the sleeve) the open loop engagement illustrated is fully satisfactory.

The sleeve end flange 36 and 38 may be omitted adjacent the portion of sleeve 16 that engages the pedestal (or the shim that is supported by the pedestal, as the case may be).

The pedestal structures employed in connection with this device are susceptible of being standardized in different sizes for application to different situations. The tie bands act only in tensile stress holding in place the whip preventing collar and restraining pipe whipping action on same (in the event of rupture) while the pedestals are designed to handle bending, compressive, and shear stresses that may be involved, as well as absorb whipping energy where built to be resilient in accordance with this invention.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A pipe movement restricting device comprising:
   a pipe,
   a pedestal structure,
   a sleeve proportioned to freely receive said pipe and be spaced from contact with same,
   said sleeve being supported on said pedestal in a position to be substantially concentric with said pipe,
   a first tie band looped about said sleeve in the plane thereof and having its ends anchored to said pedestal on one side of said pedestal, and a second tie band looped about said sleeve in the plane thereof and having its ends anchored to said pedestal on the other side of said pedestal, said tie bands being tensioned against said sleeve to press same against said pedestal and hold said sleeve in spaced relation about the pipe from divergent directions.

2. A device for restraining movement of a high pressure pipe in the event of rupture of same, said device comprising:

a pipe, a pedestal structure disposed in upright position, under the pipe and in a plane extending transversely of the pipe, a sleeve proportioned to freely receive said pipe and be spaced from contact with same thereabout, said sleeve being received over the pipe and being supported on said pedestal in a position to be spaced from said pipe about the circumference of said sleeve, a first tie band looped about said sleeve in the plane thereof and having its ends anchored to said pedestal on one side of said pedestal, and a second tie band looped about said sleeve in the plane thereof and having its ends anchored to said pedestal on the other side of said pedestal, said tie bands being tensioned against said sleeve to press same against said pedestal and hold said sleeve in said spaced relation about the pipe from divergent directions.

3. The device set forth in claim 2 wherein said pedestal structure includes:

a resilient post against which said sleeve bears under the action of said tie bands.

4. The device set forth in claim 3 wherein:

said pedestal structure is resiliently restrained against movement.

5. The device set forth in claim 2 including:

means for shim adjusting said sleeve relative to said pedestal structure.

6. The device set forth in claim 2 wherein:

said pedestal structure comprises:

an I-beam structure having diagonal side walls disposed on either side of the pipe, said side walls converging in an upward direction, said ends of the respective tie bands being respectively secured to an anchor plate adapted to engage the respective pedestal side walls, and means for releasably clamping the respective anchor plates to the respective pedestal side walls.

7. The device set forth in claim 5 wherein said clamping means includes:

means for shim adjusting said anchor plates.

8. The device set forth in claim 2 wherein:

said pedestal comprises a concrete body, said ends of the respective tie bands being secured to wedge type anchoring devices received in correspondingly shaped sockets formed in said pedestal.

9. The device set forth in claim 2 wherein:

said pedestal comprises:

a legged structure assembly, said ends of the respective tie bands being secured to legs of said assembly on either side of the pipe.

* * * * *